United States Patent [19]

Horvath

[11] Patent Number: 5,047,697
[45] Date of Patent: Sep. 10, 1991

[54] DUAL AXIS DYNAMIC FOCUS OF AN ELECTRON BEAM IN A DISPLAY MONITOR

[75] Inventor: Stephen E. Horvath, Roseville, Calif.

[73] Assignee: Hewlett-Packard Company, Palo Alto, Calif.

[21] Appl. No.: 371,875

[22] Filed: Jun. 26, 1989

[51] Int. Cl.⁵ .......................... G09G 1/04; H01J 29/58
[52] U.S. Cl. .................................................. 315/382
[58] Field of Search ............................. 315/382, 382.1

[56] References Cited

U.S. PATENT DOCUMENTS 4,587,465 5/1986 Truskalo ............................. 315/382
4,633,144 12/1886 McKibben .......................... 315/382
4,891,564 1/1990 Crowley ............................. 315/382

OTHER PUBLICATIONS

Display System Design Author Sol Sherr 1970 Library of Congress Catalogue Card No: 78-96045 pp. 234, 374-376; 416-419.

Primary Examiner—Gregory C. Issing

[57] ABSTRACT

A circuit within a display monitor is used to generate a focal voltage used to vary the focal length of an electron beam of a cathode ray tube. The circuit utilizes horizontal current placed on a horizontal deflection yoke of the cathode ray tube and utilizes vertical current placed on a vertical deflection yoke of the cathode ray tube. The circuit includes a horizontal capacitor, a vertical capacitor, a first amplifier, a second and a summing device. The horizontal capacitor is connected to the horizontal deflection yoke. Similarly, the vertical capacitor is connected to the vertical deflection yoke. The voltages across each of the vertical capacitor and the horizontal capacitor are amplified and summed to obtained the focal voltage.

5 Claims, 3 Drawing Sheets

DUAL AXIS DYNAMIC FOCUS OF AN ELECTRON BEAM IN A DISPLAY MONITOR

BACKGROUND

The present invention concerns dual axis dynamic focus of an electron beams used in a display monitor, for example, in a cathode ray tube display terminal.

Variations in the shape of display monitors are limited by what is acceptable to a user. Typically, users prefer the surface of a viewing screen of a display monitor to be as flat as possible. Further, it is typically desired that the distance from the viewing screen to the back of the display monitor be as small as possible, thus limiting the distance an electron beam generated by an electron gun can travel before colliding with the viewing screen.

The above-described geometric constraints in manufacture of a display monitor result in a large variation in distance the electron beam travels before colliding with the viewing screen. The distance the electron beam travels is dependent upon the radial distance from the center of the viewing screen to the location the electron beam collides with the viewing screen. Calculating the exact distance the electron beam travels would typically require the application of a fairly complex function dependent upon the actual shape and curvature of the viewing screen.

Because of the disparity in distance the electron beam travels before colliding with the viewing screen, it is typical to use a variable electrostatic lens to vary the focal distance of the electron beam in order to assure a sharp focus at the point of collision with the viewing screen. A focus voltage is applied to a grid on an electron gun in order to lengthen a focal distance of the electron beam from an initial focal distance. Typically the initial focal distance is the distance from the electron gun to the center of the viewing screen. The relationship of the focus voltage to the focal distance of the electron beam is approximately linear.

In the prior art various methods have been used to generate the focus voltage. One method includes the use of a diode array to implement a polynomial which approximates the voltage required to generate correct focal distances. Another method is to measure and store the voltage required to achieve the correct focus distance for each discrete location on the viewing screen. Thereafter the stored values are utilized in order to generate the correct focal distance for each discrete location on the viewing screen. These solutions, however, are complex and costly to implement.

SUMMARY OF THE INVENTION

In accordance with the preferred embodiment of the present invention a circuit within a display monitor is presented. The circuit is used to generate a focal voltage used to vary the focal length of an electron beam of a cathode ray tube. The circuit utilizes horizontal current placed on a horizontal deflection yoke of the cathode ray tube and utilizes vertical current placed on a vertical deflection yoke of the cathode ray tube. The circuit includes a horizontal capacitor, a vertical capacitor, a first amplifier, a second and a summing device. The horizontal capacitor is connected to the horizontal deflection yoke and may be the same capacitor used for "s" correction. Similarly, the vertical capacitor is connected to the vertical deflection yoke and may be the same capacitor used for "s" correction. The voltages across each of the vertical capacitor and the horizontal capacitor are amplified and summed to obtained the focal voltage.

The present invention has advantages over the prior art. The invention may be embodied entirely from inexpensive analog circuitry. The resultant circuit has low power consumption and is inexpensive to manufacture.

DESCRIPTION OF THE PREFERRED EMBODIMENT

Figure 1:
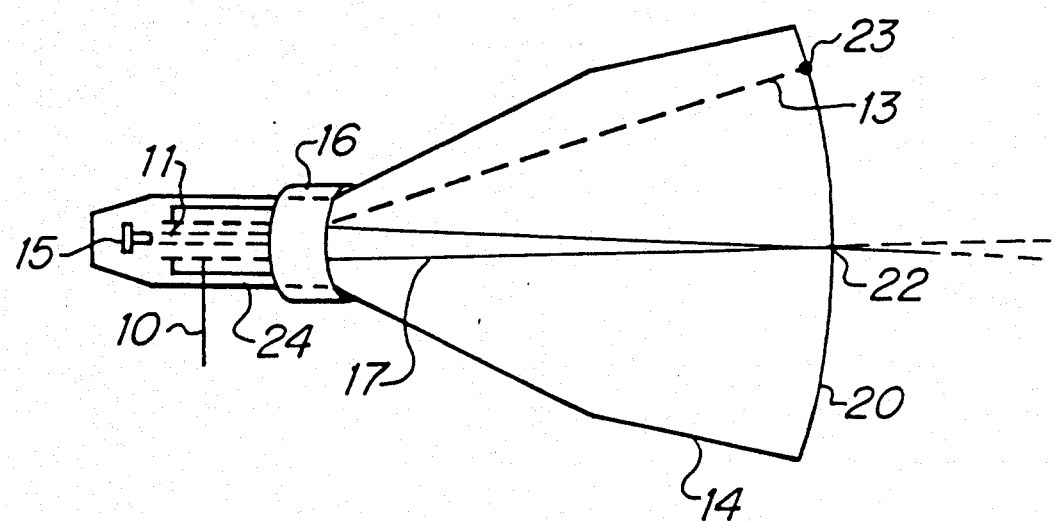
FIG. 1 shows a electron beam generated in a cathode ray tube in accordance with the preferred embodiment of the present invention.

In FIG. 1, a cathode ray tube 24 of a display monitor 14 is shown. An electron gun 15 generates an electron beam 11 which collides with a viewing screen 20. When not deflected electron beam 11 travels along a path 17 to a center 22 of viewing screen 20. Electron beam 11 may be deflected by deflection circuitry 16 to collide with different portions of viewing screen 20. For example, if electron beam 11 is deflected by deflection circuitry 16 to travel a long a path 13, electron beam 11 will collide with viewing screen 20 at a location 23. In order to account for the greater length of path 13 as compared to path 17, an adjustment is made to a focal voltage placed on plate 10 in order to lengthen the focal distance of electron beam 11, resulting in electron beam being focussed at the point of collision with viewing screen 20.

Figure 2:
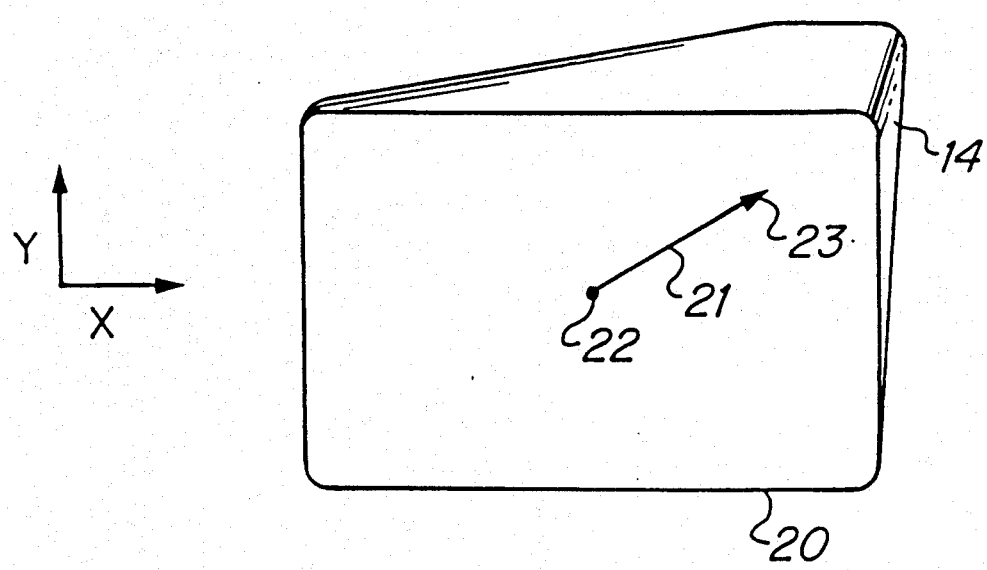
FIG. 2 shows a viewing screen of a display monitor in accordance with the preferred embodiment of the present invention.

In FIG. 2, location 23 is shown to be a radial distance 21 from center 22. Distance 21 may be broken into an "x" component and a "y" component. The required adjustment to the focal voltage for location 23 may be approximated by function which multiplies a constant by the sum of the "x" component squared by the "y" component squared.

Figure 3:
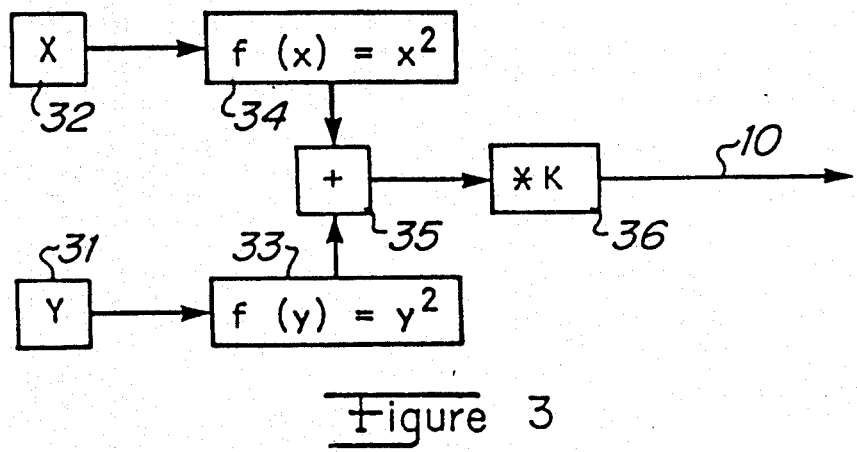
FIG. 3 is a block diagram of a function which generates a focal distance correction voltage in accordance with an embodiment of the present invention.

FIG. 3 shows one way of implementing such a function for approximating the adjustment to the focal voltage. An entity 32 representing the "x" component of the radial distance from center 22 of viewing screen 20 is squared by a squaring function 34. Similarly, an entity 31 representing the "y" component of the radial distance from center 22 of viewing screen 20 is squared by a squaring function 33. The output of squaring function 34 and squaring function 33 are summed by a summing function 35. The output of summing function 35 at a multiplication function 36 is multiplied by a constant (K) to produce the adjustment of the focal voltage to be placed on plate 10.

Figure 4:
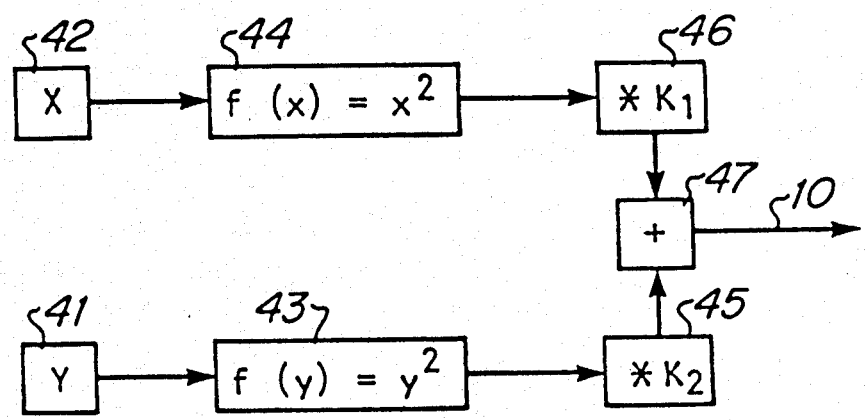
FIG. 4 is a block diagram of a second function which generates a focal distance correction voltage in accordance with the preferred embodiment of the present invention.

FIG. 4 shows an alternate implementation of a function which approximates the adjustment to the focal voltage. Entity 42 representing the "x" component of the radial distance from center 22 of viewing screen 20 is squared by a squaring function 44. The output of function 44 is then, at a multiplication function 46, multiplied by a constant (K1). Similarly, entity 41 representing the "y" component of the radial distance from center 22 of viewing screen 20 is squared by a squaring function 43. The output of function 43 is then, at a multiplication function 45, multiplied by a constant (K2). The output of multiplication function 46 and multiplication function 45 are summed by a summing function 47 to produce the adjustment of the focal voltage to be placed on plate 10.

Figure 5:
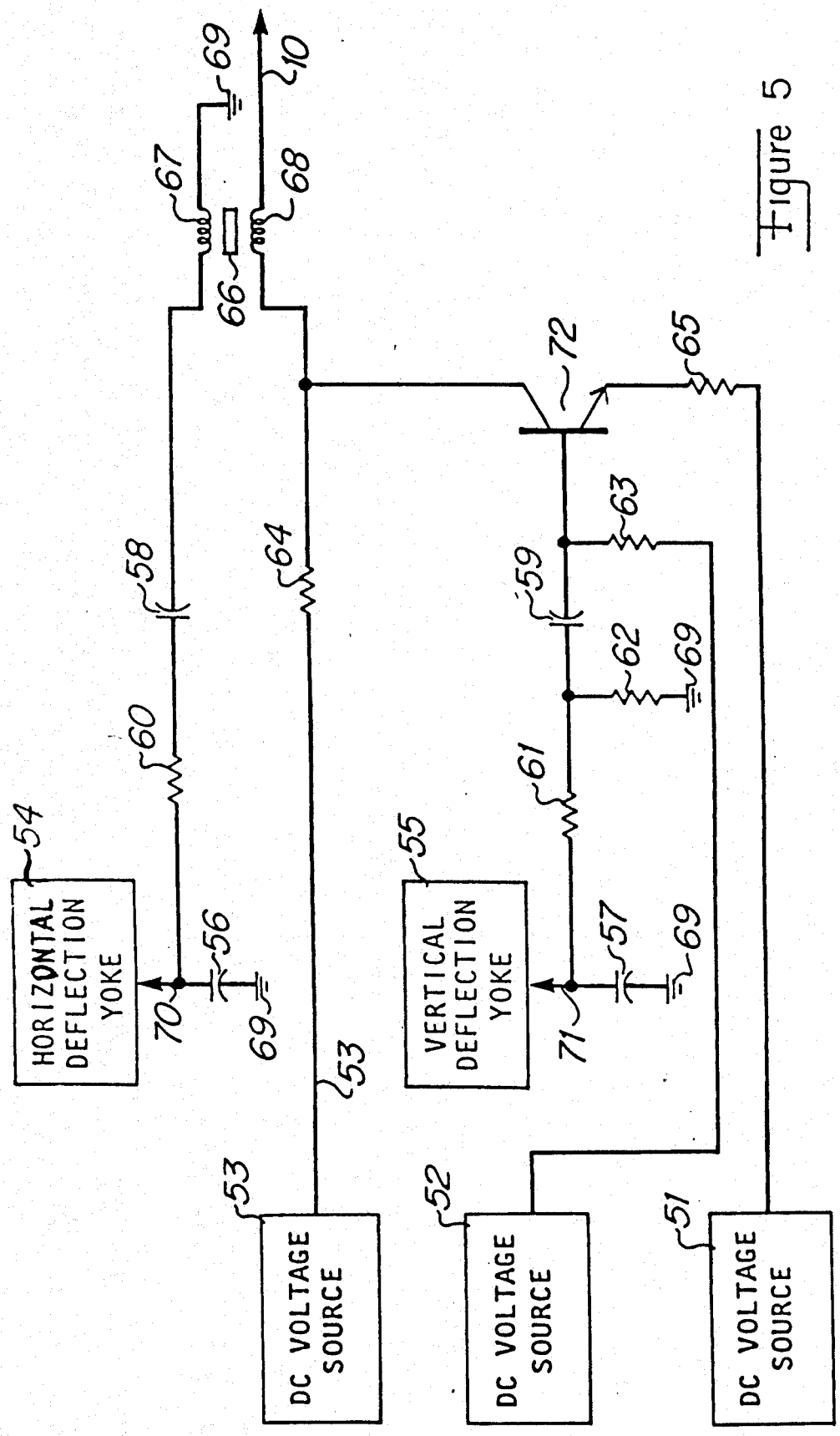
FIG. 5 shows a schematic of a circuit which implements the second function shown in FIG. 4 in accordance with the preferred embodiment of the present invention.

FIG. 5 shows a component level schematic of a circuit which implements the function shown in FIG. 4. A horizontal deflection yoke 54 deflects electron beam 11 horizontally. The "x" component of the radial distance from center 22 of viewing screen 20 varies approximately linearly with the current through horizontal deflection yoke 54. A vertical deflection yoke 55 deflects electron beam 11 vertically. The "y" component of the radial distance from center 22 of viewing screen 20 varies approximately linearly with the current through vertical deflection yoke 55.

The current through horizontal deflection yoke 54 is in the form of a linear ramp. The current through horizontal deflection yoke 54 is also used to charge coupling capacitor 56. Coupling capacitor 56 may be the same capacitor used for "s" correction of the current through horizontal deflection yoke 54. The resultant voltage at point 70 varies parabolically over time with reference to a reference voltage 69. Therefore, the current through horizontal deflection yoke 54 acts as entity 42 and capacitor 56 serves as squaring function 44. Similarly, the current through vertical deflection yoke 55 is in the form of a linear ramp. The current through vertical deflection yoke 55 is also used to charge coupling capacitor 57. Coupling capacitor 57 may be the same capacitor used for "s" correction of the current through vertical deflection yoke 55. The resultant voltage at point 71 varies parabolically over time with reference to a reference voltage 69. Therefore, the current through vertical deflection yoke 55 acts as entity 41 and capacitor 57 serves as squaring function 43.

A transformer 66 has windings 67 and 68. The turnings ration between windings 67 and windings 68 acts as multiplication function 46. The input impedance of transformer 66 at windings 67 should be ten times the input impedance of capacitor 59 at the sweep frequency of the linear ramp current waveform through horizontal deflection yoke 54. Further, the self-resonant frequency of the transformer must be substantially higher than the sweep frequency of the linear ramp current waveform through horizontal deflection yoke 54.

A resistor 61, a resistor 62, a resistor 63, a resistor 64, a resistor 65 and a transistor 72 act as multiplication function 45. Specifically, transistor 72 and resistors 63, 64 and 65 function as a common-emitter bipolar amplifier. This amplifier in series with windings 68 of transformer 66 implement the summing function 47. For optimum performance it is recommended to minimize the capacitance on the collector node of transistor 72. A resistor 60 serves to make the circuit more stable.

Capacitor 56 has a capacitance of, for example, 0.82 micro Farads. Capacitor 57 has a capacitance of, for example 400 micro Farads. A capacitor 58 has a capacitance of, for example, 1 micro Farad. A capacitor 59 has a capacitance of, for example, 1 micro farad. Resistor 60 has a resistance of, for example, ten ohms. Resistor 60 has a resistance of, for example, ten ohms. Resistor 61 has a resistance of, for example, one hundred ohms. Resistor 62 has a resistance of, for example, 4.7 kilohms. Resistor 63 has a resistance of, for example, 4.7 kilohms. Resistor 64 has a resistance of, for example, one megohms. Resistor 65 has a resistance of, for example, fifteen kilohms. The ratio of windings 67 to windings 68 in transformer 66 is one to twenty. A DC voltage of 650 volts is provided by a DC voltage supply 53, as shown. A DC bias voltage, which may be varied from $-100$ to $-90$ volts, is provided by a DC voltage supply 52, as shown. A DC voltage of $-100$ volts is provided by a DC voltage 51, as shown.

The present invention utilizes analog circuitry to generate the voltage to be placed on plate 10. The circuit has low power consumption and is inexpensive to manufacture.

Figure 6:
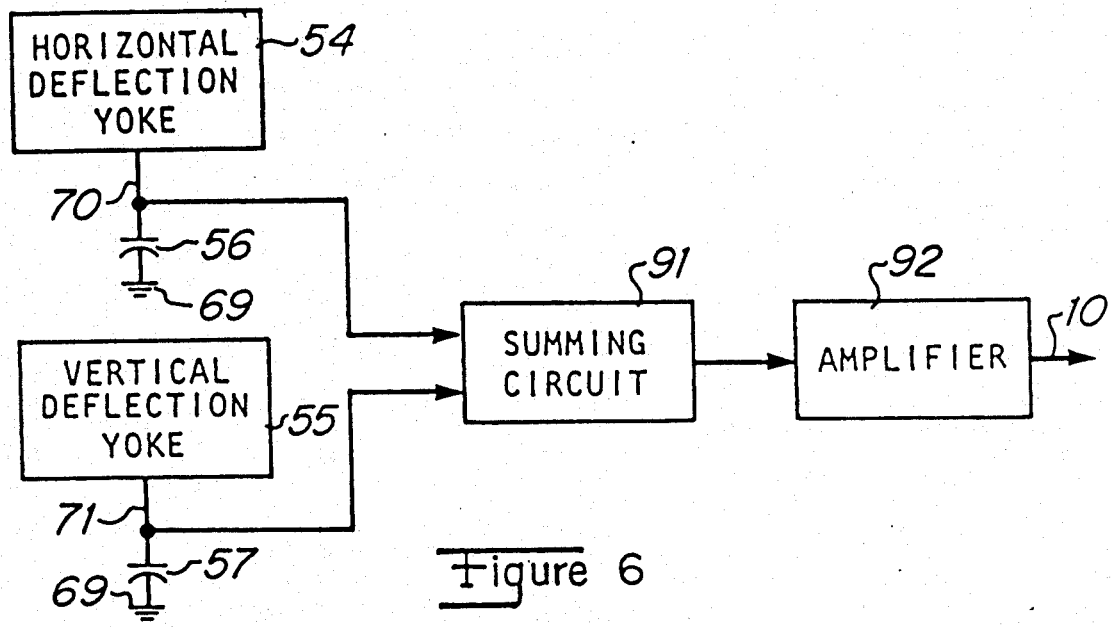
FIG. 6 shows a block diagram of a circuit which implements the function shown in FIG. 3 in accordance with an alternate embodiment of the present invention.

FIG. 6 shows an alternate embodiment in which the function shown in FIG. 3 is implemented. A summing circuit 91 is connected to an input of horizontal deflection yoke 54 and vertical deflection yoke 55 as shown. The output of summing circuit 91 is connected to an amplifier 92. Amplifier 92 produces a focal voltage to be placed on plate 10.

I claim:

1. In a display monitor, a circuit for generating a focal voltage used to vary focal length of an electron beam in a cathode ray tube, the circuit utilizing horizontal current placed on a horizontal deflection yoke of the cathode ray tube and vertical current placed on a vertical deflection yoke of the cathode ray tube, the circuit comprising:

horizontal capacitance means, coupled to the horizontal deflection yoke, for receiving a portion of the horizontal current;

vertical capacitance means, coupled to the vertical deflection yoke, for receiving a portion of the vertical current;

first amplifying means, coupled to the vertical capacitance means, for amplifying a voltage signal across the vertical capacitance means to produce a first amplified voltage, the first amplifying means including a transistor having a base, an emitter and a collector, the emitter being coupled through a first resistor to a first DC bias voltage, the collector being coupled through a second resistor to a second DC bias voltage, and the base being coupled through a coupling capacitor and through a voltage divider to the vertical capacitance means and being coupled through a third resistor to a third DC bias voltage;

second amplifying means, coupled to the horizontal capacitance means, for amplifying a voltage signal across the horizontal capacitance means for producing a second amplified voltage; and, summing means, coupled to the the collector of the transistor and to the second amplifying means, for summing the first amplified voltage and the second amplified voltage to produce the focal voltage.

2. A circuit as in claim 1 wherein the summing means is a transformer with a secondary winding coupled to the emitter of the transistor.

3. A circuit as in claim 2 wherein the second amplifying means includes a winding ratio of the transformer.

4. A circuit as in claim 2 wherein the transformer includes a primary winding having a first lead which is grounded and a second lead coupled through a coupling capacitor to the horizontal capacitance means.

5. A circuit as in claim 3 wherein the transformer includes a primary winding having a first lead which is grounded and a second lead coupled through a coupling capacitor to the horizontal capacitance means.

* * * * *